US007322545B2

(12) United States Patent
Sheahan, Jr. et al.

(10) Patent No.: US 7,322,545 B2
(45) Date of Patent: Jan. 29, 2008

(54) STRUCTURAL MECHANISM FOR UNLOCKING AND ENGAGING A CONTROLLABLE SURFACE ON A HINGED PLATFORM (WING)

(75) Inventors: James J. Sheahan, Jr., Florissant, MO (US); Charles E. Morris, Des Peres, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/320,886

(22) Filed: Dec. 29, 2005

(65) Prior Publication Data

US 2007/0152098 A1 Jul. 5, 2007

(51) Int. Cl.
*B64C 3/56* (2006.01)
*B64C 13/00* (2006.01)

(52) U.S. Cl. ........................ 244/49; 244/99.2
(58) Field of Classification Search ............... 244/49, 244/99.2, 3.29; 92/19
See application file for complete search history.

(56) References Cited

U.S. PATENT DOCUMENTS

| | | | | | |
|---|---|---|---|---|---|
| 2,044,357 | A | * | 6/1936 | Kerr | 244/49 |
| 2,534,764 | A | * | 12/1950 | Focht | 244/49 |
| 2,538,602 | A | * | 1/1951 | Taylor et al. | 244/49 |
| 2,712,421 | A | * | 7/1955 | Naumann | 244/49 |
| 2,743,618 | A | * | 5/1956 | Watson et al. | 74/99 R |
| 2,932,473 | A | * | 4/1960 | Kass et al. | 244/90 R |
| 3,125,956 | A | * | 3/1964 | Kongelback | 244/3.29 |
| 3,142,459 | A | * | 7/1964 | Baetke | 244/99.2 |
| 3,165,280 | A | * | 1/1965 | Lee | 244/12.4 |
| 3,751,995 | A | * | 8/1973 | Carlson | 74/20 |
| 3,907,219 | A | * | 9/1975 | Pharris | 244/7 A |
| 4,044,971 | A | * | 8/1977 | Pharris | 244/7 R |
| 4,575,025 | A | * | 3/1986 | Sadvary et al. | 244/3.27 |
| 4,788,746 | A | | 12/1988 | Idler | |
| 4,979,700 | A | * | 12/1990 | Tiedeman et al. | 244/99.2 |
| 5,326,049 | A | * | 7/1994 | Rom et al. | 244/3.28 |
| 5,558,299 | A | * | 9/1996 | Veile | 244/49 |
| 5,645,249 | A | * | 7/1997 | Hein | 244/49 |
| 5,762,294 | A | * | 6/1998 | Jimmerson | 244/49 |
| 5,820,072 | A | * | 10/1998 | Na et al. | 244/49 |
| 5,836,541 | A | * | 11/1998 | Pham | 244/2 |
| 6,056,237 | A | * | 5/2000 | Woodland | 244/3.15 |
| 6,073,882 | A | | 6/2000 | Zieger | |
| 6,076,767 | A | | 6/2000 | Farley et al. | |
| 6,322,021 | B1 | | 11/2001 | Fisher et al. | |

(Continued)

*Primary Examiner*—Teri Pham Luu
*Assistant Examiner*—Joseph W Sanderson
(74) *Attorney, Agent, or Firm*—McNees Wallace & Nurick LLC

(57) ABSTRACT

A structural mechanism for an aircraft includes a support, a hinged surface, and a hinge assembly joining the hinged surface to the support. An actuation system includes an actuator shaft engaged to the hinges and lying coincident with a hinged-surface hinge axis and extending through the aligned center passageways of the hinges of the hinge assembly. A lock is selectively operable to lock the hinged surface to the support when the actuator shaft engages the lock. An actuator structure is controllably operable to move the actuator shaft longitudinally along the hinge-surface hinge axis between a first shaft axial position wherein the actuator shaft engages the lock and the hinges, and a second shaft axial position wherein the actuator shaft does not engage the lock but does engage the hinges, and is controllably operable to rotate the actuator shaft about the hinged-surface hinge axis.

24 Claims, 4 Drawing Sheets

U.S. PATENT DOCUMENTS

| | | |
|---|---|---|
| 6,345,790 B1 | 2/2002 | Brix |
| 6,513,762 B2 | 2/2003 | Fink et al. |
| 6,576,880 B2 * | 6/2003 | Martorana et al. ............ 244/3.1 |
| 6,675,673 B2 * | 1/2004 | Starken ........................ 74/527 |
| 6,802,475 B2 * | 10/2004 | Davies et al. ............... 244/99.2 |
| 6,824,099 B1 | 11/2004 | Jones |
| 2004/0200928 A1 * | 10/2004 | Degenholtz et al. ...... 244/75 R |
| 2004/0200929 A1 * | 10/2004 | Perni et al. ............... 244/75 R |

* cited by examiner

STRUCTURAL MECHANISM FOR UNLOCKING AND ENGAGING A CONTROLLABLE SURFACE ON A HINGED PLATFORM (WING)

This invention relates to a structural mechanism having a hinged surface and, more particularly, to an air vehicle having a deployable wing whose control surface is locked against movement prior to wing deployment, and is controllably movable after wing deployment.

BACKGROUND OF THE INVENTION

Unmanned surveillance air vehicles, glide munitions, winged missiles, and other types of air vehicles are sometimes configured to be carried internally or externally on a larger mother aircraft. Because the carried air vehicle itself is usually small and typically has a limited range, it is flown to a location near to where it is to perform its mission, as cargo on the mother aircraft, and then air launched to perform the mission. The carried air vehicle may later be recovered, or it may be considered expendable and destroyed at the completion of the mission.

The carried air vehicle has laterally extending wings, which make it awkward to store the carried air vehicle on the mother aircraft. To facilitate the internal or external storage and transport on the mother aircraft, the carried air vehicle may be provided with folding wings. The folding wings are in a folded storage position during carriage, and then are unfolded to a deployed flight position either shortly prior to launch or shortly after launch from the mother aircraft.

In most of these carried air vehicles, the wings have hinged control surfaces pivotably attached to the trailing edges. These control surfaces must be retained in a fixed position when the wing is in the folded storage position so that they do not flutter and do not become pivotably displaced to some unknown angle. After deployment, the control surfaces must be in a known, defined position ready to perform their function in aiding in the control of the air vehicle.

Accomplishing the positioning of the control surfaces with wing-mounted structure is not difficult in conventional circumstances. However, with increasing air vehicle speeds and smaller air vehicles, design considerations have mandated the use of thinner wings, in some cases about 3 inches or less thick. The conventional locks, structures, and drives required for the control surfaces cannot be sufficiently miniaturized to be accommodated within these very thin wings.

Consequently, there is a need for an approach to positioning and moving the control surfaces of wings that is suitable for use with thin wings. The present invention fulfills this need, and further provides related advantages.

SUMMARY OF THE INVENTION

The present invention provides a structural mechanism having a support and an actuation system for locking an attached hinged surface, and for later controllably unlocking and controllably pivotably moving the hinged surface. The actuation system includes an actuator structure for the hinged surface. When fully engaged, the actuator structure introduces no additional backlash into the motion of the hinged surface. The support may be an air vehicle having a fixed body, such as the fuselage of an aircraft, with a support surface to which the hinged assembly is affixed, such as a folding wing that is deployed from the fuselage. The actuator structure is preferably positioned within the body of the structure, with only an actuator shaft and some related, relatively small-sized components extending outboard from the fixed body. Consequently, the actuation system may be used with thin support surfaces, as well as thicker support surfaces. The present approach is operable with any thickness of support surface, but it is most advantageously applied to relatively thin support surfaces, such as those having a thickness of about 3 inches or less. As used herein, a support surface can be any aerodynamic shape extending from a fuselage and may include, but is not limited to, a wing, a tail including a V-shaped tail, a horizontal stabilizer, a vertical stabilizer or fins. A wing generally has an aerodynamic shape, typically having a thinner profile as its distance from the fuselage increases, with an angle of sweep from 0-45°, and can be of any shape from the preferred long, thin shape to a delta shape.

Although the application of greatest current interest is in carried air vehicles with folding wings, the invention is not so limited and is more broadly applicable. For example, it may be applied in fields as diverse as lifts used in stationary or vehicle-mounted applications, automobiles such as racecars, and ships using airfoils or hydrofoils.

In accordance with the invention, a structural mechanism comprises a support, a hinged surface, and a hinge assembly joining the hinged surface to the support so that the hinged surface may pivot relative to the support. The hinge assembly comprises at least one hinge. The hinges taken together have center bores, holes or passageways therethrough linearly aligned along a hinged-surface hinge axis. As used herein, bores, holes or passageways are used interchangeably to refer to the aperture in the hinge, which generally have a length greater than a diameter. An actuation system comprises an actuator shaft lying coincident with the hinged-surface hinge axis and extending through the aligned center passageways of the hinges of the hinge assembly. The actuator shaft is engaged to the hinges through the passageways and thence to the hinged surface. A lock is selectively operable to lock the hinged surface to the support when the actuator shaft engages the lock. An actuator structure is controllably operable to move the actuator shaft longitudinally along the hinge-surface hinge axis between a first shaft axial position wherein the actuator shaft engages the lock and the hinges, and a second shaft axial position wherein the actuator shaft does not engage the lock but does engage the hinges. The actuator structure is also controllably operable to rotate the actuator shaft about the hinged-surface hinge axis. There is an actuator controller for the actuator structure.

In an application of particular interest relating to hinged control surfaces on folding wings of air vehicles, a structural mechanism comprises a body of an air vehicle, a folding surface joined to the body of the air vehicle, wherein the folding surface is movable from a stowed position to a deployed position, a hinged surface that is typically a control surface, and a hinge assembly joining the control surface to the folding surface so that the control surface may pivot relative to the folding surface. The hinge assembly comprises at least two spaced-apart hinges. The hinges have center bores therethrough linearly aligned along a control-surface hinge axis. An actuation system comprises an actuator shaft lying coincident with the control-surface hinge axis and extending through the aligned center bores of the hinges of the hinge assembly. The actuator shaft is engaged to the hinges and thence to the hinged control surface. A lock is selectively operable to lock the control surface to the folding surface when the actuator shaft engages the lock. An actuator structure is controllably operable to move the actuator shaft longitudinally along the control-surface hinge axis between a first shaft axial position wherein the actuator shaft engages the lock and the hinges, and a second shaft axial position wherein the actuator shaft does not engage the lock but does engage the hinges. The actuator structure is also controllably operable to rotate the actuator shaft about the control-surface hinge axis. There is an actuator controller for the actuator structure.

In a preferred form, each of the hinges comprises an interior hinge spline. The actuator shaft comprises an exterior shaft spline for each of the interior hinge splines. The exterior shaft splines are positioned to engage the respective interior hinge splines to permit movement of the actuator shaft longitudinally along the control-surface hinge axis between the first shaft axial position and the second shaft axial position. The engagement between the interior hinge splines and the exterior shaft splines is maintained during this movement.

The lock preferably also utilizes splines on the actuator shaft. In one embodiment, the lock comprises an exterior locking spline on the actuator shaft at a location remote from the actuator structure, and a compatible interior locking spline in the wing. The exterior locking spline is engaged to the interior locking spline when the actuator shaft is in the first shaft axial position and does not engage the interior locking spline when the actuator shaft is in the second shaft axial position. To eliminate freeplay between the locking splines, the exterior locking spline and the interior locking spline may have compatible wedge-shaped teeth to produce a wedged engagement between the exterior locking spline and the interior locking spline.

The actuator structure preferably comprises an engagement linear device controllably operable to move the actuator shaft longitudinally along the control-surface hinge axis between the first shaft axial position and the second shaft axial position. This actuator structure also preferably includes a rotational actuator engaged to the actuator shaft, whereby the actuator shaft may be controllably rotated. After the hinged surface is unlocked from the support wing, this rotation of the actuator shaft produces rotation of the hinged control surface, thereby causing a pivoting motion about the control-surface hinge axis and thence providing flight control. The engagement linear device and the rotational actuator may be positioned at any operable location, but they are preferably located in the air-vehicle fuselage. Consequently, only the relatively small-diameter actuator shaft extends outboard into the wing, allowing the use of this approach with a relatively thin wing.

An important feature of the present approach is that it permits the control surface to be reliably and reproducibly positioned in its locked position, and thereby established in a known initial position when initially unlocked. The actuator controller may therefore define a zeroed pivotable position of the control surface (i.e., the faired position) when the actuator shaft is in the first shaft axial position. In normal operations, the powered components of the actuator structure, which are the engagement linear device and the rotational actuator in the preferred embodiment, may be unpowered when the actuator shaft is in the first shaft (i.e., locked) position. When the wing is to be deployed and the control surface operated, the engagement linear device and the rotational actuator are powered, and set to a defined zeroed value associated with the locked rotational position of the actuator shaft and the control surface. Upon movement of the actuator shaft to the second shaft axial position, thereby unlocking the control surface, the rotational actuator is in a known state ready for input of control-signal deviations to the rotational actuator and thence to the control surface.

With this embodiment, the rotational actuator is engaged to the control surface prior to unlocking the control surface.

The air-vehicle structure may optionally include a retention mechanism to retain the actuator shaft in the second shaft axial position, so that it may not be unintentionally relocked during service. One form of the retention mechanism includes a retention pin-receiver recess in the actuator shaft and a retention pin in the fuselage. The retention pin is disposed to engage the pin-receiver recess when the actuator shaft is in the second shaft axial position. A retention pin driver drives the retention pin into the pin-receiver recess when the retention pin is aligned with the pin-receiver recess. The retention mechanism may be made such that it operates a single time for an air vehicle in which the wing is deployed from the stowed position only a single time. The retention mechanism may instead be controllable, so that it may be controllably reset to allow the wing to be relocked in the stowed position. In the case of the controllable retention-pin embodiment, the retention pin driver controllably withdraws the retention pin from the pin-receiver recess to enable relocking of the actuator shaft in the first shaft axial position.

The present approach positively locks the wing control surface when the wing is in its stowed position and then provides for unlocking the control surface when the wing is deployed to its flight position. The actuator shaft used in the locking and unlocking is also utilized to drive the pivoting movement of the control surface in service. The actuator or actuators used in the actuator structure may be positioned in the interior of the fuselage rather than in the wing, with only the actuator shaft extending into the wing itself and to the locking mechanism and the hinges of the control surface. The actuator controller provides for the position of the control surface to be determined accurately at its initial i.e., zeroed-and-locked) position. Subsequent movements are relative to that accurately determined initial position.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

The present invention is discussed in relation to its presently preferred embodiment, the application to a hinged deployable wing and its control surface.

Figure 1:
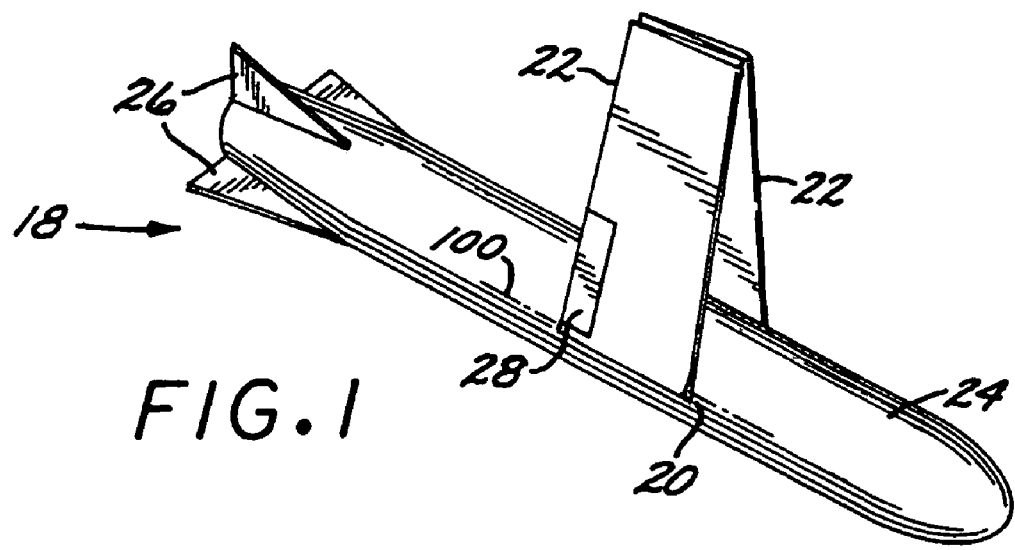
FIG. 1 is a perspective view of an air-vehicle structure, with the wings in the stowed position.
Figure 2:
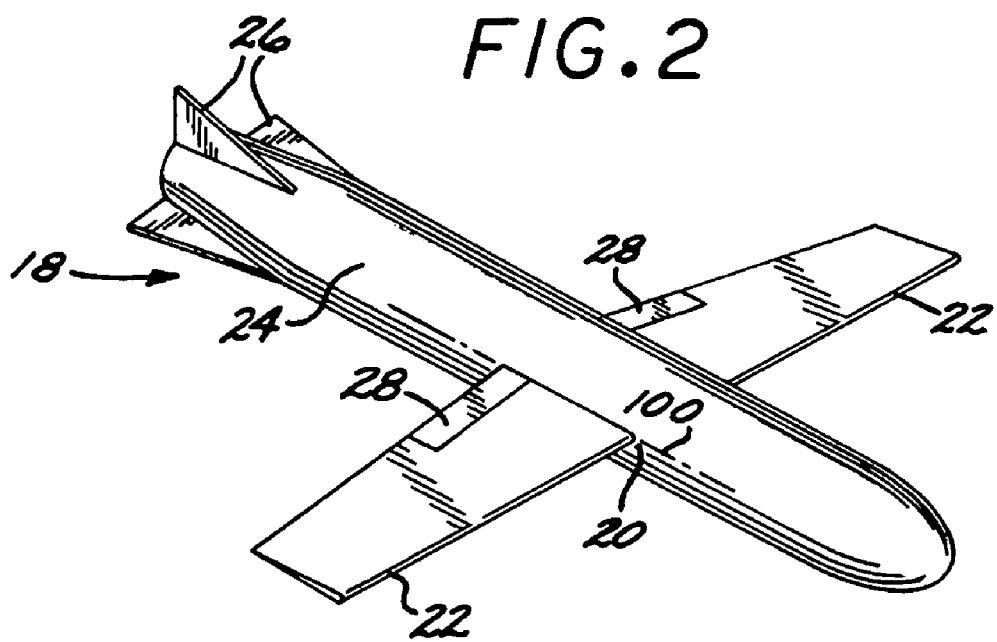
FIG. 2 is a perspective view of an air-vehicle structure, with the wings in the deployed position.

FIGS. 1 and 2 depict an air vehicle 18 having an air-vehicle structure 20 with deployable wings 22, showing the wings 22 in the stowed (FIG. 1) and deployed (FIG. 2) positions. The wings 22 are stowed in a folded position as in FIG. 1 for storage and for carriage of the air vehicle 18 on a larger mother aircraft. The wings 22 are deployed (i.e., moved) to an extended position as in FIG. 2 when the air vehicle 18 is prepared for flight, either before or after the air vehicle 18 is launched from the larger mother aircraft. The illustrated air vehicle 18 is an unmanned surveillance air vehicle, but it may be other types of air vehicles such as a glide munition or a winged missile, or it may be a manned air vehicle. The air vehicle 18 has a fuselage (i.e., body) 24 to which the wings 22 are deployably mounted, and may optionally include tail surfaces 26.

The wings 22 are typically relatively thin, preferably with a thickness of 3 inches or less. The relative thinness of the wings results from the small size of the air vehicle 18, the desire for light weight in the deployable wings to reduce support weight and deployment-actuator weight, and also from the aerodynamic demands for thin wings in high-speed flight. The aerodynamics of specialized air vehicle 18 increasingly mandates thin wings to achieve optimal high-speed, long-range flight characteristics.

The wings 22 have movable control surfaces (also termed "hinged surfaces") 28 thereon, in the manner of ailerons or flaps. In the illustrated embodiment, each wing 22 and the fuselage 24 together serve as the support for each respective control surface 28. The control surfaces 28 are locked into a faired position when the wings 22 are stowed, and then are unlocked when the wings 22 are deployed. The unlocked control surfaces 28 are pivoted on hinges to provide roll and other flight control for the air vehicle 18 during flight service. The present invention is concerned with the support of the control surfaces 28 from the wings 22, with the locking and unlocking of the control surfaces 28, and with the driving of the pivoting movement of the control surfaces 28 during flight. It is particularly advantageously applied where the wings 22 are relatively thin, because it preferably places the largest and heaviest components of the actuation system within the fuselage 24 rather than in the wings 22 themselves.

Figure 3:
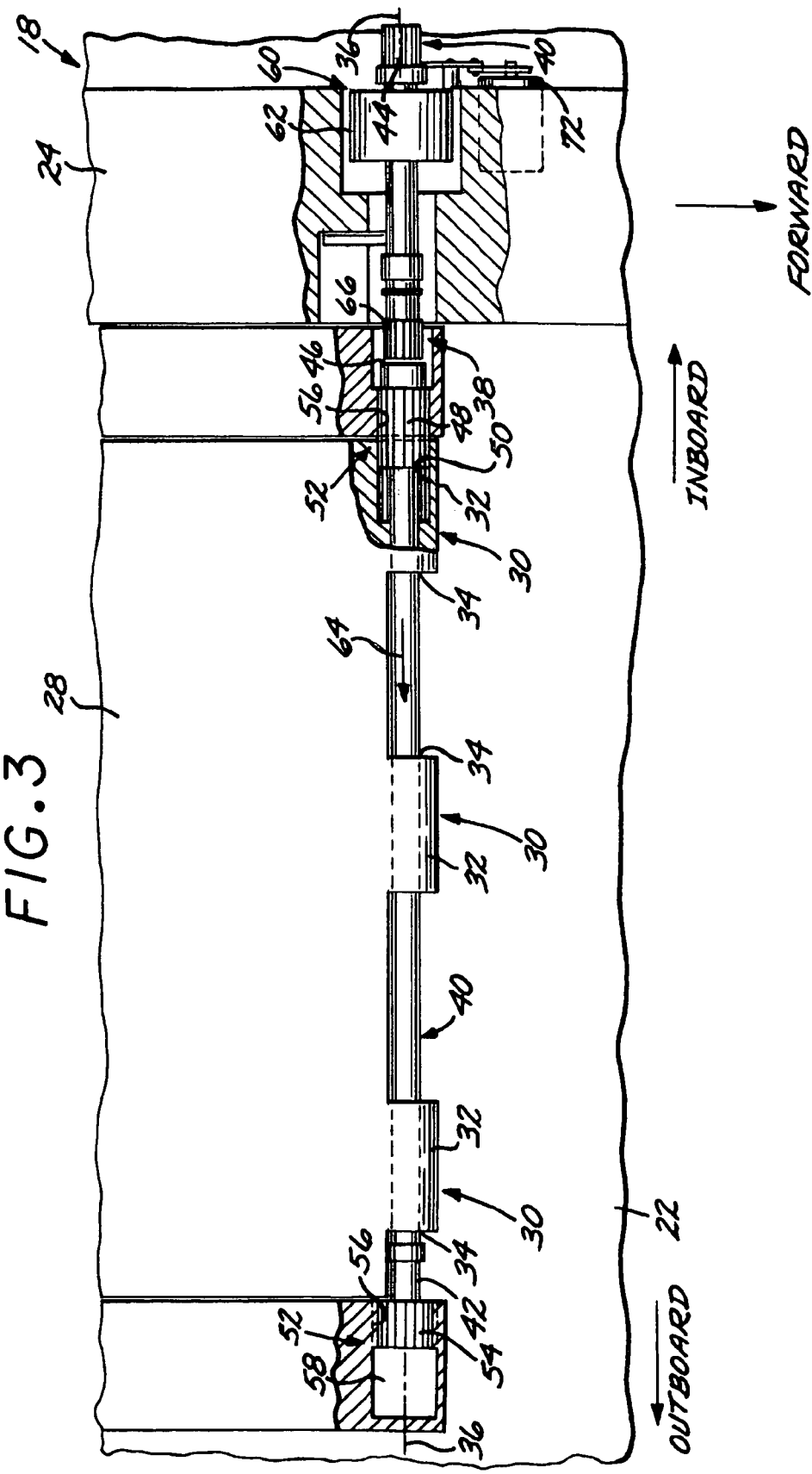
FIG. 3 is a plan view of a control surface for the air-vehicle structure of FIGS. 1 and 2, and an actuation system for the control surface.

FIG. 3 is a schematic plan view of the inboard end of the wing 22 in the deployed position of FIG. 2. As used herein, "inboard" refers to the locations closest to the fuselage 24, and "outboard" refers to locations furthest from the fuselage 24. "Inboard direction" refers to a direction toward the fuselage 24, and "outboard direction" refers to a direction away from the fuselage 24. The control surface 28 is joined to the wing 22 by a hinge assembly 30. The hinge assembly 30 provides the structural support for the control surface 28, and also permits the control surface to pivot relative to the wing 22. The hinge assembly 30 comprises at least one hinge 32, and preferably at least two spaced-apart hinges 32. In the illustration of FIG. 3, there are three spaced-apart hinges 32. The hinges 32 have center bores 34 therethrough, which are linearly aligned along a control-surface hinge axis 36.

Figure 4:
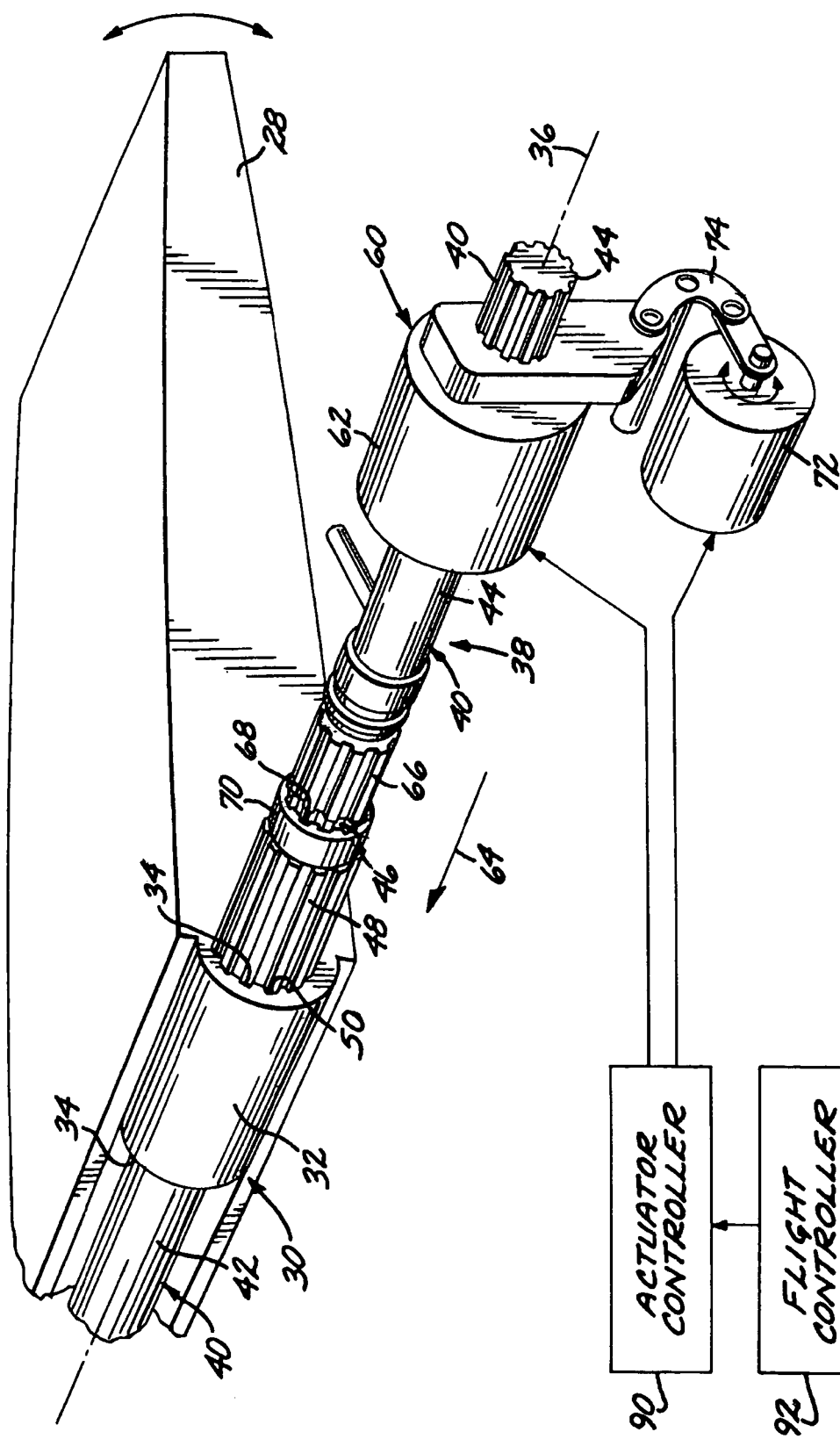
FIG. 4 is a schematic perspective view of the inboard end of the control surface and actuation system of FIG. 3.

An actuation system 38 includes an actuator shaft 40 that lies coincident with the control-surface hinge axis 36 and extends through the aligned center bores 34 of the hinges 32 of the hinge assembly 30. As shown in FIG. 4, the actuator shaft 40 includes an outboard actuator shaft segment 42 and an inboard actuator shaft segment 44. These actuator shaft segments 42 and 44 are initially separated from each other by a gap 46 that permits the outboard actuator shaft segment 42 to be folded upwardly, when the wing is stowed as in FIG. 1. After the wings 22 are deployed to the unfolded position illustrated in FIG. 2, the actuator shaft segments 42 and 44 are aligned and joined axially in a manner to be discussed subsequently.

The outboard actuator shaft segment 42 has exterior (i.e., male) shaft splines 48 thereon, positioned to engage compatible interior (i.e., female) hinge splines 50 in the center bores 34 of each of the hinges 32. FIG. 4 shows the outboard actuator shaft segment 42 axially exploded from the hinge 32 to illustrate these splines 48 and 50. The exterior shaft splines 48 are positioned lengthwise along the actuator shaft 40 to engage the respective interior hinge splines 50 to permit movement of the actuator shaft 40 longitudinally along the control-surface hinge axis 36, while continuing to maintain the engagement between the interior hinge splines 50 and the exterior shaft splines 48, and thence between the actuator shaft 40 and the control surface 28.

Figure 5:
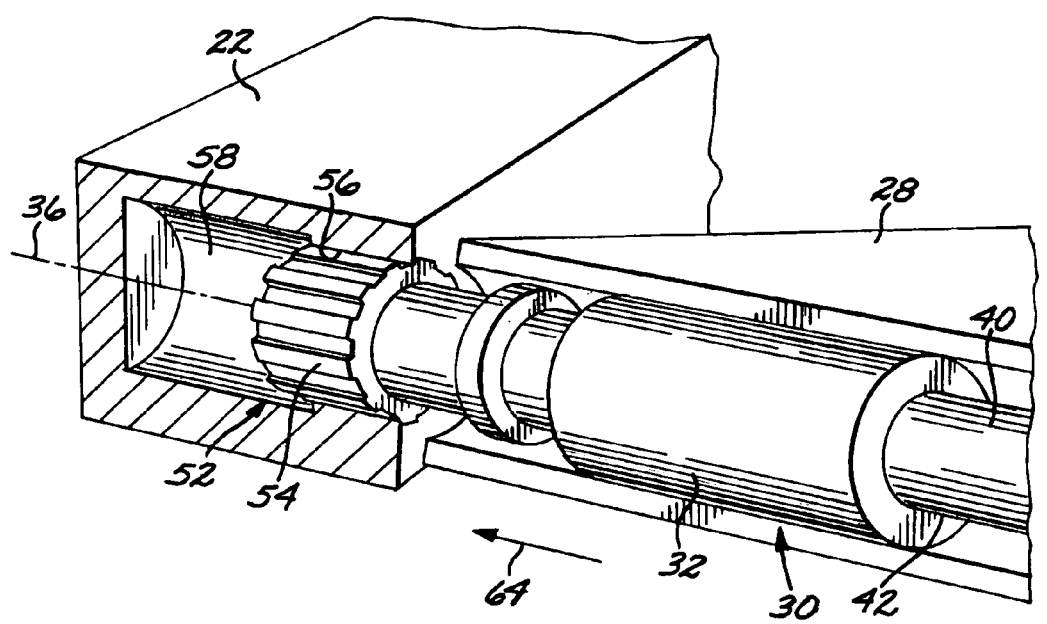
FIG. 5 is a schematic perspective, partially phantom view of the outboard end of the control surface and actuation system of FIG. 3.

The actuation system 38 further includes a lock 52 selectively operable to rotationally lock the control surface 28 to the wing 22 when the actuator shaft 40 engages the lock 52. FIG. 5 illustrates the portion of the lock 52 that is at an outboard end of the outboard actuator shaft segment 42. There is a similarly operating portion of the lock 52 at an inboard end of the actuator shaft segment 42, illustrated in FIG. 3. The lock 52 comprises an exterior (i.e., male) locking spline 54 on the outboard actuator shaft segment 42, and an interior (i.e., female) locking spline 56 along a portion of the length of a cylindrical locking cavity 58 aligned along the control-surface hinge axis 36 in the wing 22 adjacent to the control surface 28. The interior locking spline 56 is found on only an inboard end of the cylindrical locking cavity 58, leaving an outboard end of the locking cavity 58 with a smooth bearing surface.

When the wing 22 is in the stowed position, the outboard actuator shaft segment 42 is axially positioned so that exterior shaft splines 48 engage the interior hinge splines 50, and the exterior locking spline 54 engages the interior locking spline 56. The engagement between the exterior locking spline 54 and the interior locking spline 56 locks the outboard actuator shaft segment 42 to the locking cavity 58 and the wing 22, so that the outboard actuator shaft segment 42 cannot rotate relative to the wing 22. Because the outboard actuator shaft segment 42 is locked against rotation to the hinges 32 by the engagement between the exterior shaft splines 48 and the interior hinge splines 50, the outboard shaft segment is locked against rotation to the hinges 32 and thence to the control surface 28. Consequently, the control surface 28 is locked at a known zero-degree pivoting position relative to the wing 22. However, because of the spline engagements, the outboard actuator shaft segment 42 may move axially along the control-surface hinge axis 36 relative to the hinges 32, the control surface 28, and the wing 22. This axial movement is important in the unlocking action to be described subsequently.

The actuation system 38 further includes an actuator structure 60 that is controllably operable to move the actuator shaft 40 (including both of the actuator shaft segments 42 and 44) longitudinally along the control-surface hinge axis 36 between a first shaft axial position wherein the actuator shaft 40 engages the lock 52 and the hinges 32, and a second shaft axial position wherein the actuator shaft 40 does not engage the lock 52 but does engage the hinges 32. The actuator structure 60 is also controllably operable to rotate the actuator shaft 40 about the control-surface hinge axis, when the actuator shaft 40 is in the second shaft axial position.

The longitudinal and rotational movements of the actuator structure 60 may be accomplished in any operable manner. In a preferred embodiment, the actuator structure 60 includes an engagement linear device 62 that is controllably operable to move the actuator shaft 40 longitudinally along the control-surface hinge axis 36 between the first shaft axial position and the second shaft axial position. More specifically, the engagement linear device 62 moves the inboard actuator shaft segment 44 in an outboard direction 64. The engagement linear device 62 may be of any type, but is preferably a linear motor that drives the actuator shaft 40 either in the outboard direction 64 or in both the outboard direction 64 and the opposite inboard direction. The engagement linear device 62 may instead be a spring-driven or squib-driven device, if single-use operation and no return capability are acceptable in an application.

Figure 6:
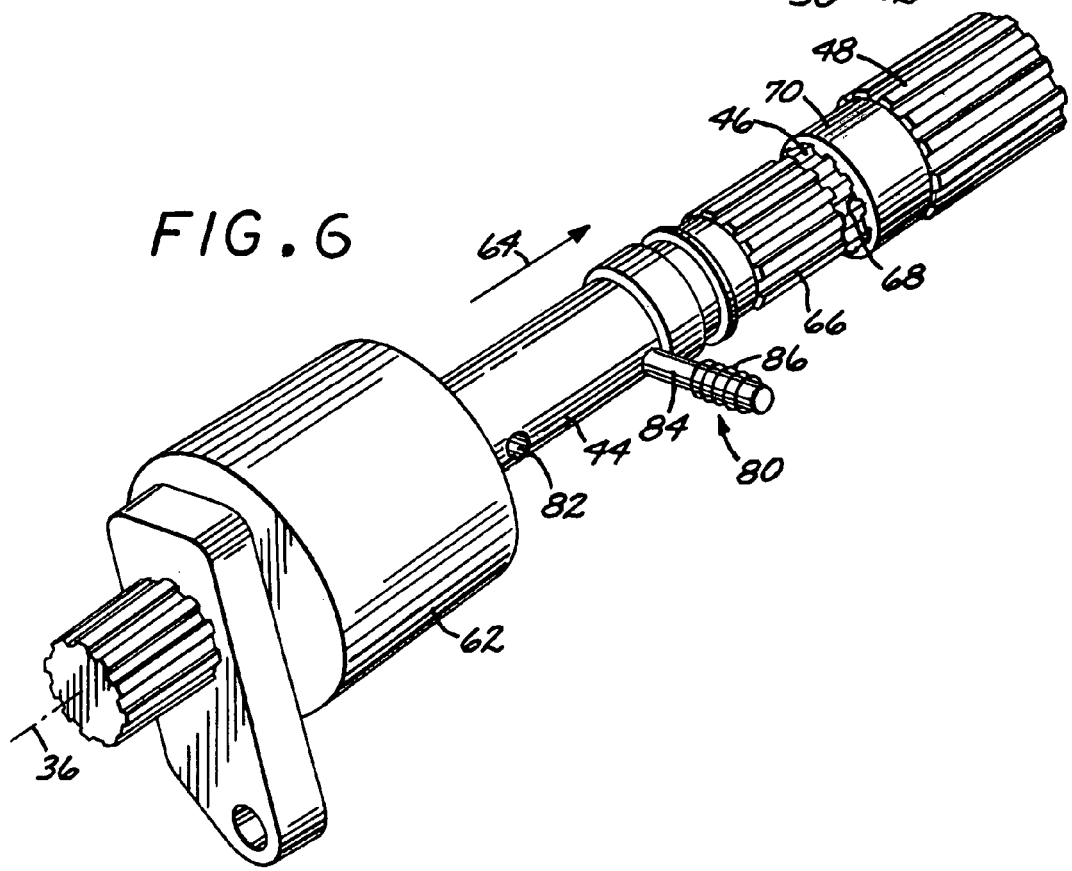
FIG. 6 is a reversed perspective view of a portion of the inboard end of the actuation system of FIG. 4.

When the actuator structure 60 is activated to move the actuator shaft 40 from the first shaft axial position to the second shaft axial position, the engagement linear device 62 drives the inboard actuator shaft segment 44 in the outboard direction 64, the gap 46 is closed and eliminated, and external (male) coupling splines 66 on the outboard end of the inboard actuator shaft segment 44 engage internal (female) coupling splines 68 in a coupling 70 on the inboard end of the outboard actuator shaft segment 42 (best seen in FIGS. 4 and 6). (The actuator structure 60 is activated only when the wing 22 is in the deployed position of FIG. 2, so that the inboard actuator shaft segment 44 and the outboard actuator shaft segment 42 are axially aligned, and the splines 66 and 68 are aligned for engagement.) The coupling splines 66 and 68 are each preferably, but not necessarily, slightly wedge-shaped end-to-end, so that the space between the coupling splines 66 and 68 is greater at the outboard end and lesser at the inboard end. The coupling splines 66 and 68 are thereby wedged together for a tight fit as the inboard actuator shaft segment 42 is driven in the outboard direction 64, so that there is essentially zero freeplay.

The wedge engagement of the coupling splines 66 and 68 ordinarily provides a sufficient engagement force that the outboard actuator shaft segment 42 remains engaged to the inboard actuator shaft segment 44 during service. However, the loss of that engagement would result in the failure of the air vehicle 18 because the control surface 28 could no longer be driven rotationally. Consequently, as best seen in FIG. 6, there may be provided an optional retention mechanism 80 that retains the actuator shaft 40 in the second shaft axial position with the outboard actuator shaft segment 42 engaged to the inboard actuator shaft segment 44 during service. The retention mechanism 80 may be either a permanent-retention mechanism that does not allow disengagement of the outboard actuator shaft segment 42 from the inboard actuator shaft segment 44 during service, or it may be a semi-permanent retention mechanism that controllably allows the actuator shaft 40 to return to the first shaft axial position by separation of the outboard actuator shaft segment 42 from the inboard actuator shaft segment 44 at the coupling 70.

FIG. 6 illustrates the presently preferred retention mechanism 80, which may be furnished in either the permanent or semi-permanent embodiments. The preferred retention mechanism 80 includes a retention-pin receiver recess 82 in the actuator shaft 40, and a retention pin 84 mounted in the fuselage 24 or an inboard portion of the wing 22, generally at a right angle to the actuator shaft 40. The retention pin 84 is disposed to engage the retention-pin receiver recess 82 when the actuator shaft 40 is in the second shaft axial position. The retention pin 84 may be driven into engagement with the retention-pin receiver recess 82 by any operable retention driver 86, when the retention pin 84 is aligned with the pin-receiver recess 82. The retention-pin driver 86 is illustrated to be a spring that biases the retention pin 84 toward the actuator shaft 40, but it may be a motor, a squib, or other type of operable driver device. The insertion of the retention pin 84 into the retention-pin receiver recess 82 may be permanent, if no device is provided to withdraw the retention pin 84 from the retention-pin receiver recess. The insertion of the retention pin 84 into the retention-pin receiver recess 82 may be semi-permanent, if a device (such as a recocking handle) is provided to controllably withdraw the retention pin 84 from the pin-receiver recess 82. The semi-permanent embodiment is used where the air vehicle 18 is reusable and the ability to relock the control surface 28 is needed.

Returning to the discussion of the functioning of the engagement linear device 62 during the unlocking operation, the movement of the (now-joined) actuator shaft 40 by the engagement linear device 62 continues in the outboard direction 64 past the point where the two shaft segments 44 and 42 are engaged together by the coupling splines 66 and 68. Referring to FIG. 5, the continuing movement of the actuator shaft 40 pushes the exterior locking spline 54 in the outboard direction 64 and out of contact with the interior locking spline 56, thereby unlocking the control surface 28 from the wing 22. The exterior locking spline 54 of the actuator shaft 40 then rides upon the cylindrical un-splined portion of the locking cavity 58, which serves as a bearing surface for rotation of the actuator shaft 40 about the control-surface hinge axis 36.

The actuator structure 60 further includes a rotational actuator 72 engaged to the actuator shaft 40, as shown in FIG. 4. The rotational actuator 72 controllably rotates the actuator shaft 40 about the control-surface hinge axis 36. The rotational actuator 72 is operated only when the actuator shaft 40 is in the second shaft axial position, so that the control surface 28 is unlocked from the wing 22. The rotational actuator 72 operates responsive to commands from an actuator controller 90 under direction of a flight controller 92 of the air vehicle 18. In the illustrated embodiment, the rotational output of the rotational actuator 72 is linked to the actuator shaft 40 by a bell-crank mechanism 74, producing a corresponding rotation about the control-surface hinge axis 36 of the actuator shaft 40. In the view shown in FIG. 4, a clockwise rotation of the actuator shaft 40 about the control-surface hinge axis 36 causes the control surface 28 to pivot clockwise about the control-surface hinge axis 36, or downwardly. A counter-clockwise rotation of the actuator shaft 40 about the control-surface hinge axis 36 causes the control surface 28 to pivot counter-clockwise about the control-surface hinge axis 36, or upwardly.

In the preferred embodiment as illustrated in the drawings, the engagement linear device 62 and the rotational actuator 72 are both located in the fuselage 24, which has more space available for these components than does the wing 22. In this preferred embodiment, only the relatively small-diameter actuator shaft 40 extends outboard into the wing 22, and it extends through the center bore 34 of the hinges 32, so that it does not require additional volume within the wing 22. As a result, the present approach is operable with thin wings, having a thickness of 3 inches or less.

The actuator controller 90 is provided for the actuator structure 60, as shown in FIG. 4. The actuator controller 90 sends control signals to the engagement linear device 62 and to the rotational actuator 72. The flight controller 92 of the flight vehicle 18 sends an activation command to initiate the operation of the engagement linear device 62 coordinated with the deployment of the wing 22, and later sends guidance commands to the actuator controller 90 to generate commands to the rotational actuator 72, to produce movements of the control surface 28 to guide the course of the air vehicle 18.

A typical mission of the air vehicle 18 starts with the wings 22 in the stowed/folded position of FIG. 1, and the control surfaces 28 locked to the wings 22 by the lock 52 in each wing. Before launching the air vehicle 18, the flight controller 92 activates the actuator controller 90, and the actuator controller 90 powers the actuator 62 and the actuator 72. The actuator controller 90 defines a zeroed pivotable position of the control surface 28 when the actuator shaft 40 is in the first shaft axial position and the control surface 28 is locked to the wing 22. Either before or after launch, the wings 22 are deployed/unfolded by rotation about a wing-pivot axis 100 (FIG. 1) that is perpendicular to, and typically does not intersect, the control-surface hinge axis 36. The actuator controller 90 thereafter powers the engagement linear device 62 to drive the inboard actuator shaft segment 44 in the outboard direction 64 from the first shaft axial position to the second shaft axial position. The coupling splines 66 and 68 engage, and the outboard actuator shaft segment 42 is forced in the outboard direction 64 to disengage the locking splines 54 and 56, thereby unlocking the control surface 28 from the wing 22. From this point onward, the rotational actuator 72 is controlled by the flight controller 92 operating via the actuator controller 90 to controllably rotate the actuator shaft 40 about the control-surface hinge axis 36, providing one of the aerodynamic controls to the flight vehicle 18.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A structural mechanism comprising:
   a support;
   a hinged surface;
   a hinge assembly joining the hinged surface to the support so that the hinged surface may pivot relative to the support, wherein the hinge assembly comprises at least one hinge, and wherein the at least one hinge has a center passageway; therethrough linearly aligned along a hinged-surface hinge axis;
   an actuation system comprising
      an actuator shaft lying coincident with the hinged-surface hinge axis and extending through the aligned center passageways of the at least one hinge of the hinge assembly, wherein the actuator shaft is engaged to the at least one hinge,
      a lock selectively operable to lock the hinged surface to the support when the actuator shaft engages the lock, wherein the lock comprises
         an exterior locking spline on the actuator shaft at a location remote from the actuator structure, and
         a compatible interior locking spline in the support, wherein the exterior locking spline is engaged to the interior locking spline when the actuator shaft is in a first shaft axial position and is not engaged to the interior locking spline when the actuator shaft is in a second shaft axial position,
      an actuator structure
         controllably operable to move the actuator shaft longitudinally along the hinge-surface hinge axis between the first shaft axial position wherein the actuator shaft engages the lock and the at least one hinge, and the second shaft axial position wherein the actuator shaft does not engage the lock but does engage the at least one hinge, and
         controllably operable to rotate the actuator shaft about the hinged-surface hinge axis; and
      an actuator controller for the actuator structure.

2. The structural mechanism of claim 1, wherein the support comprises
   a body, and
   a support surface joined to the body, wherein the hinge assembly joins the hinged surface to the support surface.

3. The structural mechanism of claim 2, wherein the support surface has a thickness of 3 inches or less.

4. The structural mechanism of claim 2, further including
   a retention pin-receiver recess in the actuator shaft,
   a retention pin in the body, wherein the retention pin is disposed to engage the pin-receiver recess when the actuator shaft is in the second shaft axial position, and
   a retention pin driver that drives the retention pin into the pin-receiver recess when the retention pin is aligned with the pin-receiver recess.

5. The structural mechanism of claim 2, further including
   a retention pin-receiver recess in the actuator shaft,
   a retention pin in the body, wherein the retention pin is disposed to engage the pin-receiver recess when the actuator shaft is in the second shaft axial position, and
   a retention pin driver that
      drives the retention pin into the pin-receiver recess when the retention pin is aligned with the pin-receiver recess, and
      controllably withdraws the retention pin from the pin-receiver recess.

6. The structural mechanism of claim 1, wherein the support comprises
   a body, and
   a folding support surface joined to the body, wherein the hinge assembly joins the hinged surface to the folding support surface.

7. The structural mechanism of claim 6, wherein the body comprises
   a fuselage of an air vehicle, and wherein the folding support surface comprises
   a folding wing joined to the fuselage.

8. The structural mechanism of claim 1, wherein the hinge assembly comprises at least two spaced-apart hinges.

9. The structural mechanism of claim 1, wherein
   the at least one hinge comprises an interior hinge spline, and
   the actuator shaft comprises an exterior shaft spline for each of the interior hinge splines, wherein the exterior shaft splines are positioned to engage the respective interior hinge splines to permit movement of the actuator shaft longitudinally along the hinged-surface hinge axis between the first shaft axial position and the second shaft axial position, while continuing to maintain the engagement between the interior hinge splines and the exterior shaft splines.

10. The structural mechanism of claim 1, wherein the actuator structure comprises
   an engagement linear device controllably operable to move the actuator shaft longitudinally along the hinged-surface hinge axis between the first shaft axial position and the second shaft axial position, and a rotational actuator engaged to the actuator shaft, whereby the actuator shaft may be controllably rotated.

11. The structural mechanism of claim 1, wherein the actuator controller defines a zeroed pivotable position of the hinged surface when the actuator shaft is in the first shaft axial position.

12. The structural mechanism of claim 1, further including a retention mechanism that retains the actuator shaft in the second shaft axial position.

13. The structural mechanism of claim 1, further including a controllable retention mechanism that controllably retains the actuator shaft in the second shaft axial position, and controllably allows the actuator shaft to return to the first shaft axial position.

14. A structural mechanism comprising:

a support comprising a body, and a support surface joined to the body, wherein a hinge assembly joins the hinged surface to the support surface;

a hinged surface;

the hinge assembly joining the hinged surface to the support surface so that the hinged surface may pivot relative to the support surface, wherein the hinge assembly comprises at least one hinge, and wherein the at least one hinge has a center passageway therethrough linearly aligned along a hinged-surface hinge axis;

an actuation system comprising an actuator shaft lying coincident with the hinged-surface hinge axis and extending through the aligned center passageways of the at least one hinge of the hinge assembly, wherein the actuator shaft is engaged to the at least one hinge, a lock selectively operable to lock the hinged surface to the support when the actuator shaft engages the lock, an actuator structure controllably operable to move the actuator shaft longitudinally along the hinge-surface hinge axis between a first shaft axial position wherein the actuator shaft engages the lock and the at least one hinge, and a second shaft axial position wherein the actuator shaft does not engage the lock but does engage the at least one hinge, and controllably operable to rotate the actuator shaft about the hinged-surface hinge axis, wherein the actuator structure comprises an engagement linear device controllably operable to move the actuator shaft longitudinally along the hinged-surface hinge axis between the first shaft axial position and the second shaft axial position, and a rotational actuator engaged to the actuator shaft, whereby the actuator shaft may be controllably rotated, wherein the engagement linear device and the rotational actuator are located in the body; and an actuator controller for the actuator structure.

15. A structural mechanism comprising:

a body of an air vehicle;

a folding surface joined to the body of the air vehicle, wherein the folding surface is movable from a stowed position to a deployed position;

a control surface;

a hinge assembly joining the control surface to the folding surface so that the control surface may pivot relative to the folding surface, wherein the hinge assembly comprises at least two spaced-apart hinges and wherein the hinges have passageways therethrough linearly aligned along a control-surface hinge axis;

an actuation system comprising an actuator shaft lying coincident with the control-surface hinge axis and extending through the passageways of the hinges of the hinge assembly, wherein the actuator shaft is engaged to the hinges, a lock selectively operable to lock the control surface to the folding surface when the actuator shaft engages the lock, an actuator structure controllably operable to move the actuator shaft longitudinally along the control-surface hinge axis between a first shaft axial position wherein the actuator shaft engages the lock and the hinges, and a second shaft axial position wherein the actuator shaft does not engage the lock but does engage the hinges, and controllably operable to rotate the actuator shaft about the control-surface hinge axis, wherein the actuator structure comprises an engagement linear device controllably operable to move the actuator shaft longitudinally along the control-surface hinge axis between the first shaft axial position and the second shaft axial position, and a rotational actuator engaged to the actuator shaft, whereby the actuator shaft may be controllably rotated, wherein the engagement linear device and the rotational actuator are located in the body; and an actuator controller for the actuator structure.

16. The structural mechanism of claim 15, wherein each of the hinges comprises an interior hinge spline, and the actuator shaft comprises an exterior shaft spline for each of the interior hinge splines, wherein the exterior shaft splines are positioned to engage the respective interior hinge splines to permit movement of the actuator shaft longitudinally along the control-surface hinge axis between the first shaft axial position and the second shaft axial position, while continuing to maintain the engagement between the interior hinge splines and the exterior shaft splines.

17. The structural mechanism of claim 15, wherein the actuator structure comprises an engagement linear device controllably operable to move the actuator shaft longitudinally along the control-surface hinge axis between the first shaft axial position and the second shaft axial position, and a rotational actuator engaged to the actuator shaft, whereby the actuator shaft may be controllably rotated.

18. The structural mechanism of claim 15, wherein the actuator controller defines a zeroed pivotable position of the control surface when the actuator shaft is in the first shaft axial position.

19. The structural mechanism of claim 15, further including a retention mechanism that retains the actuator shaft in the second shaft axial position.

20. The structural mechanism of claim 15, further including a controllable retention mechanism that controllably retains the actuator shaft in the second shaft axial position, and controllably allows the actuator shaft to return to the first shaft axial position.

21. The structural mechanism of claim 15, further including
- a retention pin-receiver recess in the actuator shaft,
- a retention pin in the body, wherein the retention pin is disposed to engage the pin-receiver recess when the actuator shaft is in the second shaft axial position, and
- a retention pin driver that drives the retention pin into the pin-receiver recess when the retention pin is aligned with the pin-receiver recess.

22. The structural mechanism of claim 15, further including
- a retention pin-receiver recess in the actuator shaft,
- a retention pin in the body, wherein the retention pin is disposed to engage the pin-receiver recess when the actuator shaft is in the second shaft axial position, and
- a retention pin driver that
  - drives the retention pin into the pin-receiver recess when the retention pin is aligned with the pin-receiver recess, and
  - controllably withdraws the retention pin from the pin-receiver recess.

23. The structural mechanism of claim 15, wherein the folding surface has a thickness of 3 inches or less.

24. A structural mechanism comprising:
- a body of an air vehicle;
- a folding surface joined to the body of the air vehicle, wherein the folding surface is movable from a stowed position to a deployed position;
- a control surface;
- a hinge assembly joining the control surface to the folding surface so that the control surface may pivot relative to the folding surface, wherein the hinge assembly comprises at least two spaced-apart hinges and wherein the hinges have passageways therethrough linearly aligned along a control-surface hinge axis;
- an actuation system comprising
  - an actuator shaft lying coincident with the control-surface hinge axis and extending through the passageways of the hinges of the hinge assembly, wherein the actuator shaft is engaged to the hinges,
  - a lock selectively operable to lock the control surface to the folding surface when the actuator shaft engages the lock, wherein the lock comprises
    - an exterior locking spline on the actuator shaft at a location remote from the actuator structure, and
    - a compatible interior locking spline in the folding surface, wherein the exterior locking spline is engaged to the interior locking spline when the actuator shaft is in the first shaft axial position and does not engage the interior locking spline when the actuator shaft is in the second shaft axial position,
  - an actuator structure
    - controllably operable to move the actuator shaft longitudinally along the control-surface hinge axis between a first shaft axial position wherein the actuator shaft engages the lock and the hinges, and a second shaft axial position wherein the actuator shaft does not engage the lock but does engage the hinges, and
    - controllably operable to rotate the actuator shaft about the control-surface hinge axis; and
- an actuator controller for the actuator structure.

\* \* \* \* \*